Dec. 6, 1955   J. A. DOW   2,726,077
HEATING APPARATUS FOR TREATING METALS
AND INCLUDING MOVABLE SUPPORTS
Original Filed Oct. 28, 1947   3 Sheets-Sheet 2

INVENTOR.
John A. Dow.
BY
Attorney.

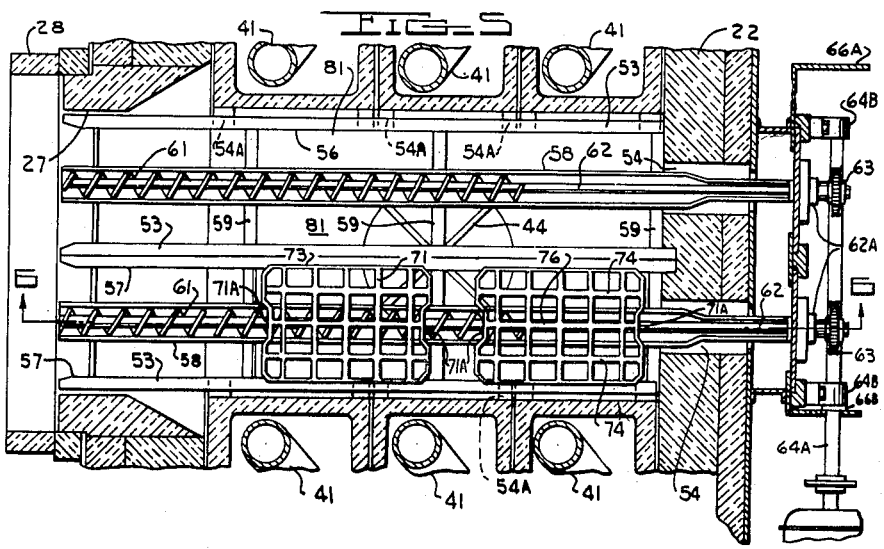
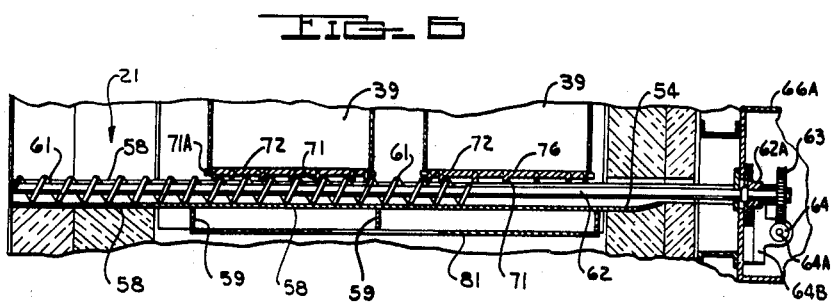
INVENTOR.
JOHN A. DOW

United States Patent Office 2,726,077
Patented Dec. 6, 1955

2,726,077

HEATING APPARATUS FOR TREATING METALS AND INCLUDING MOVABLE SUPPORTS

John A. Dow, Huntington Woods, Mich.; Doris B. Dow, administratrix of John A. Dow, deceased, assignor to Doris B. Dow, Royal Oak, Mich., as trustee Original application October 28, 1947, Serial No. 782,647, now Patent No. 2,639,138, dated October 28, 1947. Divided and this application November 6, 1951, Serial No. 261,877

3 Claims. (Cl. 266—4)

This invention relates to the art of heat treating metals and has particular relation to furnace apparatus employed in this art, equipped with conveyor, quenching and other mechanisms, all operatively associated and related in such manner as to improve and to simplify the practices employed in the art and to reduce the cost of operation thereof. This application is a division of Dow Patent No. 2,639,138, issued May 19, 1953, for Heat Treating Apparatus.

An object of the invention is to provide a heat treating furnace apparatus in which conveyor means is employed within the furnace for facilitating the handling of work to be processed in the furnace and for making the furnace more easily and efficiently related to other equipment which the process of heat treating may require.

Another object of the invention is to provide a heat treating furnace apparatus with various auxiliary apparatus by which the heat treating process may be made more flexible and efficient with respect to various requirements for heat treating placed upon all of such apparatus than has heretofore been capable of realization.

Another object of the invention is to provide a construction and arrangement of the parts of a heat treating furnace mechanism whereby such parts of the furnace which may require service may be more expeditiously removed and reinstalled than was possible heretofore.

Other and further objects of the invention will be apparent by reference to the accompanying drawings of which there are three (3) sheets, which by way of illustration show a preferred embodiment and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims. I also contemplate that of the several different features of my invention, certain ones thereof may be advantageously employed in some applications separate and apart from the remainder of the features.

In the drawings:

Fig. 5 is an enlarged fragmentary horizontal sectional view through the furnace taken in a plane along the line 5—5 of Fig. 1; and Fig. 6 is a fragmentary vertical sectional view taken along the line 6—6 of Fig. 5.

Figure 1:
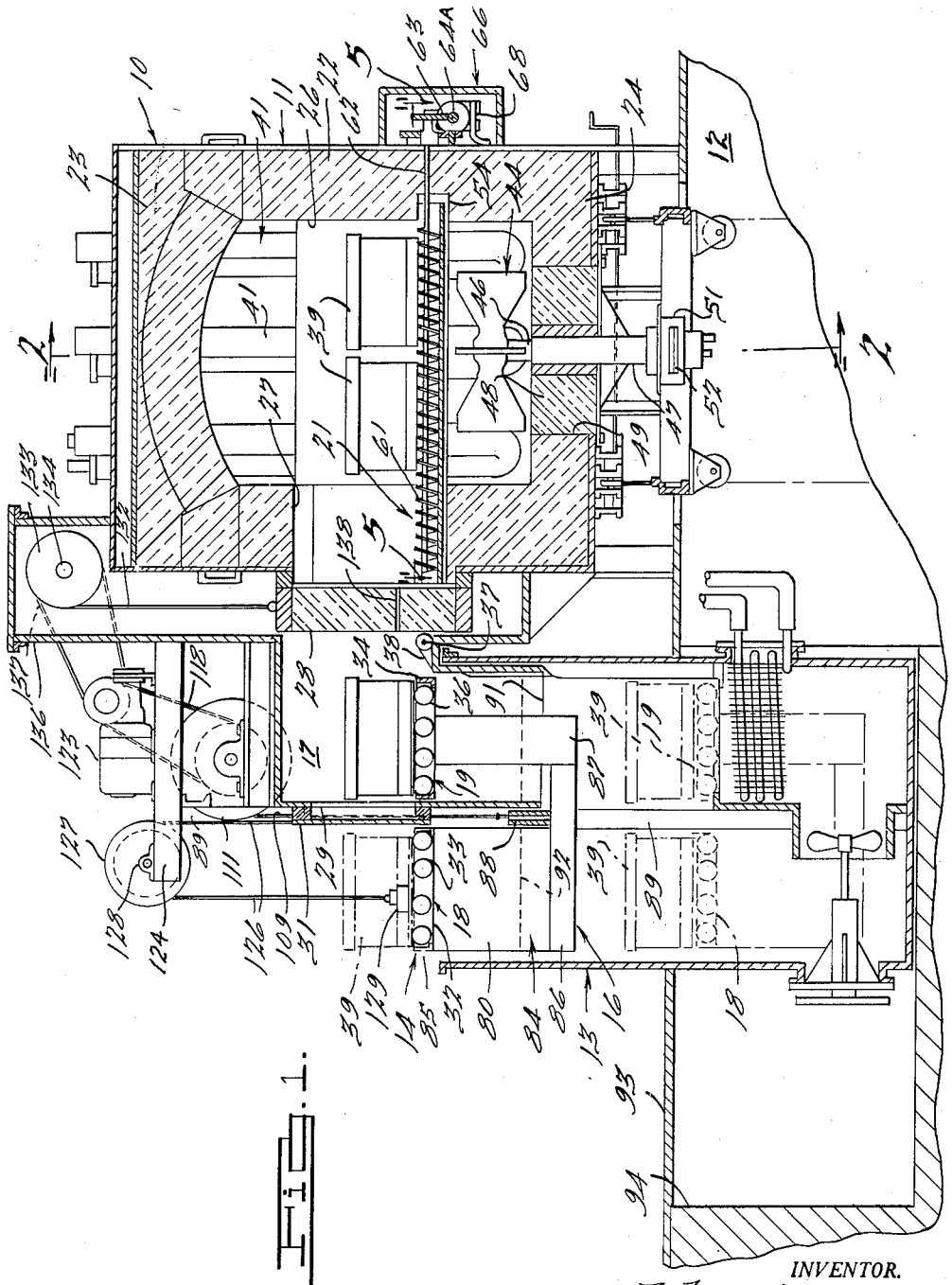
Fig. 1 is a longitudinal sectional elevational view of a heat treating apparatus embracing the principles of the invention, with certain parts thereof illustrated diagrammatically.

The heat treating apparatus 10 disclosed by all of the figures of the drawings comprises a heat treating furnace 11, a furnace pit 12, a quenching apparatus 13, a conveyor 14, and an elevator 16, the latter comprising a portion of the conveyor mechanism 14. The furnace 11 is provided with a furnace vestibule 17 located outside the furnace 11 and through which work to be processed is moved from outside the furnace to the furnace and to the quenching apparatus 13. The conveyor 14 comprises a plurality of sections 18, 19 and 21 which in combination with the elevator 13 bring about and make possible such movement of the work.

The section 18 of the conveyor 14 is located on the outside of the furnace 10, the section 19 is located within the vestibule 17 and the section 21 is located inside the furnace 11. All of these conveyor sections cooperate to provide the continuous conveyor mechanism indicated at 14.

The furnace 11 comprises a plurality of heat insulating side walls 22, a top wall 23 and a bottom wall 24 within which heat treating chamber 26 is provided. One of the walls 22 has an opening 27 formed therein which provides an access opening through which work being processed may be introduced to and removed from the heat treating chamber 26. The opening 27 is provided with a heat insulating door 28 for closing the opening 27 and the communication between the heat treating chamber 26 and the interior of the vestibule 17. The vestibule 17 also is provided with an opening indicated at 29 which provides access to the interior of the vestibule 17 and a means by which work may be moved from the conveyor section 18 to the conveyor section 19 and from the section 19 to the section 18. This opening likewise has a door 31 by which this communication may be closed.

In the form of the invention disclosed by Fig. 1 the conveyer section 18 comprises a rectangular frame 32 having spaced rollers 33 rotatably mounted therein transversely with respect to the alignment of the conveyer sections 18, 19 and 21 and whereby work to be processed may be moved to and from the vestibule 17 by rolling movement upon the rollers 33. The conveyer section 19 also has a similar rectangular frame 34 having rollers 36 similarly mounted therein and upon which work being processed may be moved into and out of the vestibule 17 either through the opening 29 to the exterior of the furnace and the conveyor section 18 or through the opening 27 into the heat treating chamber 26 and upon the conveyer section 21. A roller or other suitable conveyer means 37 mounted between brackets 38 secured upon an adjacent portion of the vestibule 17 provides means for supporting the work between the conveyer sections 19 and 21.

Figure 2:
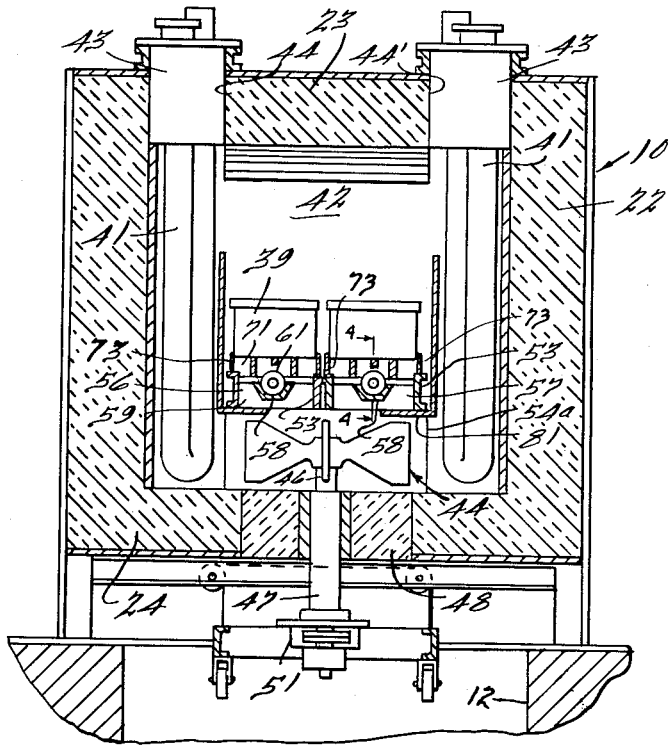
Fig. 2 is a cross sectional elevational view taken in the plane of line 2—2 of Fig. 1 through the heat treating furnace embraced in such apparatus.
Figure 3:
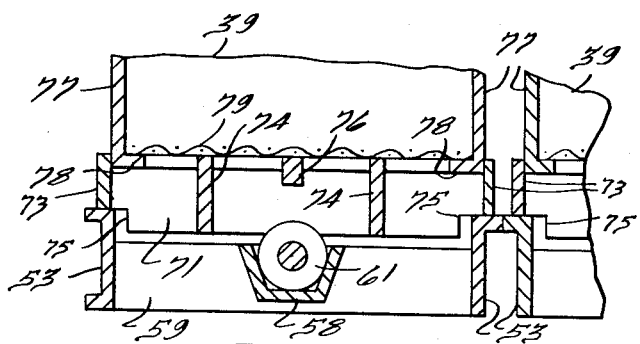
Fig. 3 is a fragmentary vertical sectional view showing one of the work containers and the associated supporting and driving means therefor within the heat treating chamber of the furnace.
Figure 4:
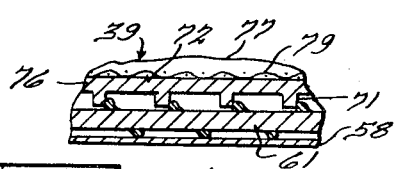
Fig. 4 is a fragmentary cross sectional view taken through a portion of the heat treating furnace illustrated by Figs. 1 and 2. The view is taken substantially in the plane of line 4—4 of Fig. 2 through the lower portion of the work conveying mechanism employed in the furnace.

The work being processed may be placed directly upon the conveyer 14 and moved between the various sections thereof or the work may be placed in work containers such as those illustrated by the numeral 39. The furnace 11 has heating means comprising a plurality of heating elements or tubes 41 projecting into the chamber 26 from the upper wall 23 thereof along opposite side walls thereof and positioned on opposite sides of the conveyer section 21 in such manner as to provide therebetween a work processing compartment indicated in Fig. 2 by the numeral 42. These heating elements or tubes 41 may be of any type of heating means that may be employed in heat treating work and may be located in the furnace in any desired manner. For example, the heating elements 41 may be U-shaped tubes such as those disclosed in my copending application for United States Patent for "Heat Treating Furnace," Serial No. 670,436, filed May 17, 1946, these tubes being adapted to be supplied with a combustible mixture which when burned internally thereof heats the exterior surface thereof and from such surface the heat is transferred to the work both by radiation and convection. These tubes also are constructed in such manner as to form a gaseous fluid internally thereof and this fluid is supplied to the heat treating chamber 26 and provides the circulating medium within such chamber by which heat is transferred to the work by convection. Such circulating medium, however, may be supplied in any other manner or may be any other kind of circulating medium which it may be desirable to employ in the process of heat treating work. However, the furnace illustrated is of the controlled gas atmosphere type so that work may be processed in the chamber 26 in a controlled gas atmosphere and the furnace and its associated gas generating and supplying apparatus are constructed so as to maintain such atmosphere in chamber 26.

In the structure disclosed the heating elements 41 are provided with headers 43 by which the tubes are secured in openings 44' formed in the upper wall 23 of the furnace 11. The circulating medium within the chamber 26 which is heated by the tubes or heating elements 41 is adapted to be circulated between the heating elements and the work by means of a fan or other suitable circulating means indicated by the numeral 44. The fan 44 is located within the chamber 26 immediately above the lower wall 24 of the furnace and below the conveyer section 21. The fan 44 is rotated by a fan shaft 46 mounted in a bearing 47 extending through and mounted within a header 48 adapted to be removably positioned in an opening 49 formed in the lower wall 24. The shaft 46 is adapted to be driven for rotating the fan 44 by any suitable means, as, for example, by an electric motor, not shown. A driven unit indicated at 51 including a belt and pulley mechanism indicated at 52 may be employed for the purpose of driving shaft 46 as a result of the operation of the motor or other means referred to. When the circulating means or fan 44 is rotated within the heat treating chamber 26, it will circulate the circulating medium contained therein upwardly around the tubes 41 and downwardly across the work supported upon the conveyer section 21.

The conveyer or conveyer section 21 preferably comprises a frame having a plurality of spaced track section such as rails indicated at 53. These rails, which are adapted to support the work being processed within the chamber 26 and to permit the slidable movement of such work upon the rails when the work is moved into and out of the chamber, extend across the opening 27 and across the chamber 26 from front to rear thereof. The rails 53 are supported at the front of the furnace upon the bottom wall of the opening 27 and at the rear thereof the frame is supported upon ledges indicated at 54 at the back wall of the furnace. The outside rails 53 of the conveyer section 21 frame may be supported intermediate their ends upon ledges 54a. Enough of the rails 53 may be employed to provide any desired number of parallel guideways for supporting work. In the structure shown by the drawings four of the rails 53 are provided forming guideways 56 and 57 and in which are located channels 58 which are supported between the rails 53. Transversely disposed cross frame members 59 interconnect rails 53 and channels 58. The channels 58 open upwardly to provide troughs for receiving worms or screws 61 the peripheral surfaces of which rest upon the interiors of the channels 58, thereby supporting the screws for rotational movement therein. Troughs 58 are adapted to hold a suitable lubricant for the screws 61, such as powdered graphite or mica.

Each screw 61 is provided with drive shaft extension 62 arranged in a reduced extension of trough 58 portion and which projects out of the furnace through openings formed in the rear wall where the shafts are provided with drive gears 63, each operatively associated with a drive worm 64 on the drive shaft 64a of a reversible motor driven driving mechanism indicated at 66. The driving mechanism 66 is secured in position upon the rear wall of the furnace 11 upon a bracket indicated at 68. The driving mechanism 66, except for the electric motor thereof, is enclosed in a suitable gas-tight housing 66a at the back of the furnace, the drive shaft 64a having a seal 66b between it and the housing wall where shaft 64a extends therethrough. Radial and thrust bearings 64b for shaft 64a and 62a for shafts 62 are arranged within such housing, the bearings 62a being supported to have a limited radial floating movement to provide for shifting of screws 61 due to expansion and contraction of the supporting structure thereof.

The gears 63 and driving mechanism 66 are so arranged that when the driving motor is rotated in one direction the two screws 61 will simultaneously rotate in the channels 58 in the same direction, and when the motor is rotated in the opposite direction the screws 61 will likewise rotate in the opposite direction. It will be observed that the diameters of the screws 61 are such that the threads of the screws project above the channels 58 where successive portions of the screw threads project between transverse supports 71 forming a part of the base portions 72 of the work containers 39. One or more of these work containers may be disposed upon each of the guideways 56 and 57 formed between the rails 53. The bases 72 also are provided with pairs of spaced longitudinal supports 73 between which are other integral longitudinal supports 74. The transverse supports 71 are notched at the ends as is indicated at 75 to provide for the extension of the supports 71 downwardly between the guides formed by the upper extremities of the rails 53.

The transverse supports 71 at the ends of the trays 72 of containers 39 have inwardly offset portions 71a at the center thereof as shown in Fig. 5 so that the minimum distance between the screw engaging portions of adjacent trays 72 (if the containers 39 were abutting each other) is slightly less than the distance between adjacent threads of screw 61 so that each tray 72 must be individually moved by screw 61 as distinguished from screw 61 moving one tray 72 and such tray 72 pushing the next adjacent tray. This arrangement is provided to prevent excess loading of the threads of screw 61 and of the screw engaging portions of trays 72.

The two longitudinal supports 73 which are formed integrally at opposite ends of the transverse supports 71 are narrower than the transverse supports 71 and are spaced from one another to such an extent that when the containers 39 are disposed upon the guideways 56 or 57 the supports 73 are maintained by the notches 75 in such position as to slidably engage the upper edges of the rails 53. The longitudinal supports 74 are of the same thickness as the transverse support 71 and are spaced inwardly from the supports 73 beyond the notches 75. Another longitudinal support indicated by the numeral 76 is disposed midway between the pairs of supports 73 and 74 for each container base 72. These latter supports extend only along the upper edge portions of the bases 72 so as to provide space therebeneath for receiving the peripheral portions of the screws 61 within the bases 72 and between the transverse supports 71 thereof.

The containers 39 also comprise metallic side walls 77 having flanges 78 around the lower edges thereof which are adapted to be seated in notches formed in the upper surfaces of the transverse members 71 immediately inside the longitudinal members 73. Grills 79 formed of wire or other suitable material are disposed inside the walls 77 in such position as to rest against the upper surfaces of the members comprising the bases 72. The grills 79 provide means for supporting work within the containers 39 in such manner that the circulating medium in the chamber 26 may be circulated downwardly over the work, through the various openings in the grills 79 and the bases 72 and between the rails 53 in response to the operation of the fan 44. In order to direct the circulating medium toward the central portion of the fan 44 there is secured upon and to the underside of the conveyer section 21 a frame a plate or baffle 81 having a central opening above and in line with the fan 44.

It will be noted that the section 19 of the conveyer 14 which is located within the vestibule 17 also is formed in such manner as to provide a continuation of the pairs of guideways 56 and 57 for guiding the bases 72 of the containers 39 thereacross. The conveyer section 19 has guide rails forming a part of the rectangular frame 34 for providing the extensions of guideways 56 and 57. The bottom surfaces of the work baskets or containers 39 rest on rollers 36 when the work is transported across or supported upon the conveyer section 19. The notches 75 in the bases 72 provide transverse guide means for maintaining the bases 72 between the upper extremities of the guide rails. However, the rollers 36 are located in such a position that the transverse supports 71 do not slidably engage the upper surfaces of the rails when the work containers are supported upon the conveyer section 19, as these transverse supports 71 do slidably engage the rails 53 when the work containers are supported upon the conveyer section 21.

In the structure disclosed by Fig. 1 the conveyer section 18 located outside the vestibule 17 is constructed with a frame 32 having similar guide rails between which the rollers 33 are mounted for supporting the containers 39.

The elevator 16 by which the conveyer sections 18 and 19 are supported comprises a pair of end frames 84 each consisting of a transverse channel member 86, a vertical channel member 87 secured at one end of the member 86 and a supporting plate 80 secured at the opposite end thereof. The plates 80 are secured to opposite ends of the frame 32 of the conveyer section 18 while the channel members 87 are secured to the opposite ends of the frame 34 of the conveyer section 19. A frame member 88 projects across the space between the end frames 84 between the conveyer sections 18 and 19 and is secured rigidly into the end frames 84 at the opposite ends thereof. Guide members 89 disposed vertically with respect to the end frames 84 and midway between the conveyer sections 18 and 19 provide means for maintaining the conveyer sections 18 and 19 in the same relative position when the elevator 16 is moved upwardly and downwardly, one guide 89 being at each side of said elevator 16.

The vestibule 17 is provided with an opening 91 across the lower extremity thereof and directly beneath the conveyer section 19 when the latter is in its upper position. The opening 91 is so arranged that when the elevator 16 is moved downwardly the conveyer section 19 will pass through the opening 91 and into the space therebeneath. Disposed about the elevator 16 and having an upper open end located just beneath the normal upper operation level of the various sections of the conveyer 14 is the quenching tank 13 in which the normal level of the quenching oil or other suitable fluid is indicated by the numeral 92. The location of the opening 91 in the lower part of the vestibule 17 is such that the quenching oil level indicated at 92 is preferably above the opening 91. The lower end of the quenching tank 13 is disposed below the level of a steel plate or other suitable floor indicated at 93 and extends into a pit 94 forming a part of and communicating with the pit 12 beneath the furnace 11. The construction and operation of the quench tank 13 and elevator 16, as well as conveyer sections 18 and 19, are fully disclosed and claimed in Dow Patent No. 2,639,138, referred to above.

The elevator 16 is adapted to be moved upwardly and downwardly for moving the conveyer sections 18 and 19 between the upper normal operational level of the conveyer sections 18 and 19 and their lower position by chains or cables 109 secured at one end of the supporting member or beam 88. The chains are adapted to be wound around pulleys 111 adapted to be driven alternately in opposite directions by a chain 118 through a reversible motor drive mechanism indicated at 123 supported upon a frame 124.

The vestibule door 31 is also provided with a cable or chain indicated at 126 which extends about a pulley 127 mounted in a bearing 128 secured to the frame 124 and the opposite end of which cable supports a counterweight 129. The door 31 may be opened or closed merely by taking hold of the end of the cable 126 supporting the counterweight 129 and lifting upwardly or pushing downwardly.

The door 28 also may be opened and closed with respect to the opening 27 leading to the heat treating chamber 26 by the operation of a cable 132 secured at one end to the door and wound around a pulley indicated at 133 which is mounted upon a shaft 134 secured in frame members not shown but located in an upwardly extending part 136 of the vestibule 17. The shaft 134 is driven in opposite directions for opening and closing the door 28 by chain 137 operatively associated with a sprocket wheel not shown but located upon the end of the shaft 134 behind the pulley 133 and another sprocket wheel, also not shown, but mounted upon the drive shaft of a second motor driven reversible drive unit identical to the drive unit 123 and located by the side of drive unit 123 upon the frame 124. The door 28 also is provided with a vent indicated at 138 for the purpose of allowing surplus circulating fluid to escape from the heat treating chamber 26 into the vestibule 17.

Assuming the heat treating chamber 26 to be filled with the desired circulating medium and to be heated by the heating elements 41 to the desired temperature for heat treating the work desired to be heat treated, the apparatus may be operated by placing a pair of work containers 39 filled with work to be heat treated upon the conveyer section 18. The door 31 leading to the vestibule 17 is then opened by pulling downwardly upon the cable 126 and thereafter the two work containers containing the work to be heat treated may be rolled into the vestibule 17 through the opening 29 and upon the conveyer section 19 merely by pushing on the work containers and moving the containers in the aligned guideways 56 and 57. On the conveyer sections 18 and 19 the work containers will be supported upon the rollers 33 and 36 and will be guided between the rails of each of the conveyer sections by the notches 75.

Assuming the proper one of the reversible drive units 123 to have been operated for opening the door 28, the containers 39 may continue to move across the conveyer section 19 upon the rollers 37 and into contact with the screws 61 and the guide rails 53 forming the guideways 56 and 57 within the conveyer section 21. By operating the motor drive unit 66 the screws 61 now may be rotated in such manner that the containers 39 will be pulled into the heat treating compartment 26 by the engagement of the upper part of the screws 61 with the transverse supports 71 forming a portion of the base 72 of each container. During such movement of the containers 39 in response to the rotation of the screws 61, the containers will be slidably supported upon the upper edges of the rails 53 by the longitudinal support members 73. When the containers 39 have arrived at an operative position in the furnace chamber 26 the operation of the drive motor 66 may be discontinued, such as by means of an automatic stopping mechanism (not shown) associated with motor drive unit 66, and thereafter the work in the containers 39 may be heat treated by closing the doors 31 and 28 and practicing the desired heat treating process.

As is illustrated by Fig. 1, four or any desired number of heat treating containers may be positioned in the furnace at one time depending upon the size of the containers and the furnace. This may be done by simply lining up several of the containers 39 in each of the guideways 56 and 57 and upon the conveyer sections 18 and 19 and the roller 37 before starting the operation of the screws 61. Thereafter when the screws 61 engage the transverse supports of the first pair of containers 39, it is necessary only to push the remaining containers upon the rollers 33, 36 and 37 in such manner as to cause these containers to follow the first pair of containers and thereafter all of the containers will be moved inwardly with respect to the heat treating chamber 26 upon the conveyer section 21.

Referring particularly to Fig. 1 and after the work has been heated to the desired extent within the chamber 26, the heat treating process may be continued by operating the motor drive unit 66 in such manner as to reverse the rotation of the screws 61. Assuming the door 28 to have been opened by operation of one of the drive units 123, the first pair of the work containers 39 wil be pushed along the rails 53 by operation of the screws 61 and outwardly into the vestibule 17. When this pair of containers has been released from the screws 61, the operation of the drive unit 66 should be discontinued and the first pair of containers 39 may then be pulled upon the rollers 37 and 36 into a position in which the bottoms of the containers 39 register with the frame 34. Thereafter the proper one of the drive units 123 is operated in such manner as to lower the conveyer sections 18 and 19 out of the upper normal operating position and into the quench tank 13 as described in said Dow Patent 2,639,138.

After the quenching operation is completed, the elevator 16 may then be raised into a position in which the conveyer sections 18 and 19 are in normal position in alignment with the conveyer section 21 and the work containers 39 then may be removed from the conveyer 18. It will be noted that during the previously described quenching operation the door 31 was allowed to remain in closed position.

Thereafter the operation of the motor drive unit 66 may be continued in such manner as to push another pair of the containers 39 from the conveyer section 21 to the conveyer section 19, and the quenching operation may be repeated until all of the containers are removed from the furnace 11 and the quenching operation has been completed for all of the work in all of the containers.

The mounting of the fan 44 and its manner of removal for purposes of repair is described in said Dow Patent 2,639,138.

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:

1. A heat treating apparatus comprising heat insulating walls defining a high temperature, controlled atmosphere heat treating furnace chamber in which metal work may be heat treated, said chamber having an opening providing access to said chamber for introducing work therein and removing work therefrom, a conveyor for supporting work being processed within said chamber and for moving said work into and out of said chamber, said conveyor comprising a pair of spaced rails extending across said chamber, a rotatable screw disposed in said chamber in parallel relation to and between said rails, a work support including spaced support sections disposed both in parallel and in transverse relation to said rails, said parallel sections being disposed upon and slidably supported by said rails whereby said rails support said work support and work thereon, and said transverse section being engageable by the threads of said screw so that said screw upon rotation thereof in either direction will move said work support upon and along said rails, said screw being so disposed with respect to said rails and said work support while the latter is supported on said rails that the substantially entire load of the work support is borne by said rails, reversible drive means operable for selectively rotating said screw in opposite directions of rotation, and a channel member extending across said chamber between and parallel to said rails and forming an upwardly opening trough in which said screw is disposed, said screw resting on and being rotatably supported by said channel.

2. A heat treating apparatus according to claim 1 wherein said channel forms a lubricant container for said screw, and lubricant in said channel.

3. A heat treating apparatus comprising heat insulating walls defining a high temperature, controlled atmosphere heat treating furnace chamber in which metal work may be heat treated, said chamber having an opening providing access to said chamber for introducing work therein and removing work therefrom, a conveyor for supporting work being processed within said chamber and for moving said work across said chamber, said conveyor comprising a pair of spaced parallel track sections extending across said chamber, rotatable screw means disposed in said chamber in parallel relation to and between said track sections, a work support including spaced support elements disposed parallel to said track sections and a support element disposed transversely thereto, said parallel support elements resting upon and being movable along said track sections, said screw means being engageable with said transverse support element so that upon rotation of said screw means said work support is moved upon and along said track sections, said screw means being so disposed with respect to said track sections and said work support while the latter is supported on said track sections that the substantially entire load of the work support is borne by said track sections, reversible drive means operable for selectively rotating said screw means in opposite directions, and a channel member extending across said chamber between and parallel to said track sections and forming an upwardly opening trough in which said screw is disposed, said screw resting on and being rotatably supported by said member.

References Cited in the file of this patent

UNITED STATES PATENTS

| 1,438,680 | Barron | Dec. 12, 1922 |
| 1,593,351 | Paige | July 20, 1926 |
| 1,805,360 | De Vlieg | May 12, 1931 |
| 1,819,509 | Harris | Aug. 18, 1931 |
| 1,828,324 | Kruse | Oct. 20, 1931 |
| 2,002,030 | Grothe | May 21, 1935 |
| 2,087,731 | Klouman | July 20, 1937 |
| 2,439,127 | Dailey, Jr. et al. | Apr. 6, 1948 |
| 2,451,053 | Anderson et al. | Oct. 12, 1948 |

FOREIGN PATENTS

| 690,848 | France | Sept. 26, 1930 |

OTHER REFERENCES

Trinks' Industrial Furnaces, vol. II, second edition, pages 265 and 266. Copyright 1942, pub. by John Wiley & Sons, New York.